US006552132B2

(12) United States Patent
Belt et al.

(10) Patent No.: US 6,552,132 B2
(45) Date of Patent: Apr. 22, 2003

(54) PROCESS FOR THE HYDROGENATION OF A POLYMER COMPOSED OF DIENE MONOMER UNITS AND NITRILE GROUP CONTAINING MONOMER UNITS AND HYDROGENATED POLYMER

(75) Inventors: Johannes W. Belt, Geleen (NL); Jacobus A. A. Vermeulen, Geleen (NL); Nikhil K Singha, Best (NL); Olav M Aagaard, Geleen (NL); Mike Köstermann, Nieuw-Bergen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/779,700

(22) Filed: Feb. 9, 2001

(65) Prior Publication Data

US 2001/0023277 A1 Sep. 20, 2001

Related U.S. Application Data

(63) Continuation of application No. PCT/NL99/00508, filed on Aug. 9, 1999.

(30) Foreign Application Priority Data

Aug. 11, 1998 (NL) ............................................. 1009841
Jul. 9, 1999 (NL) ............................................. 1012554

(51) Int. Cl.$^7$ ............................. C08C 19/02; C08F 8/04
(52) U.S. Cl. .................... 525/338; 525/339; 525/328.3; 525/329.3
(58) Field of Search ........................... 525/328.3, 329.3, 525/338, 339

(56) References Cited

U.S. PATENT DOCUMENTS 5,039,737 A * 8/1991 Parker et al. ................ 524/804
5,057,601 A 10/1991 Schiessl et al.
5,075,388 A 12/1991 Rempel et al.
5,424,356 A * 6/1995 Parker et al. ................ 524/555
5,442,009 A 8/1995 Parker et al.

* cited by examiner

Primary Examiner—D. R. Wilson
(74) Attorney, Agent, or Firm—Pillsbury Winthrop LLP

(57) ABSTRACT

The invention relates to a process for the hydrogenation of a polymer composed of diene monomer units and nitrile group containing monomer units in which crosslinks formed as a result of the hydrogenation are broken by adding, before, during or after the hydrogenation, a compound that satisfies the formula $R_1$—N(H)—X (I) or $(R_1)(R_2)C$=N—Y (II), where $R_1$ is a hydrogen atom, an alkyl or cycloalkyl group with 1–30 carbon atoms, or an aromatic group with 6–30 carbon atoms and $R_2$ is an alkyl or cycloalkyl group with 1–30 carbon atoms, or an aromatic group with 6–30 carbon atoms, X is chosen from the group comprising —$R_3$, —$OR_4$, —$SR_4$, —$NR_5R_6$, where $R_3$, $R_4$ and $R_5$ are a hydrogen atom, an alkyl or cycloalkyl group with 1–30 carbon atoms or an aromatic group with 6–30 carbon atoms and $R_6$ is an alkyl or cycloalkyl group with 1–30 carbon atoms or an aromatic group with 6–30 carbon atoms Y is chosen from the group comprising —$R_7$, —$OR_8$, —$SR_8$, —$NR_9R_{10}$ and —$N$=$CR_{11}R_{12}$, where $R_7$, $R_8$, $R_9$, $R_{10}$, $R_{11}$ and $R_{12}$ are a hydrogen atom, an alkyl or cycloalkyl group with 1–30 carbon atoms or an aromatic group with 6–30 carbon atoms, and where it is possible for $R_3$–$R_{12}$ to also contain one or more heteroatoms from the groups 13, 14, 15, 16 or 17 of the Periodic System of the Elements.

19 Claims, No Drawings

PROCESS FOR THE HYDROGENATION OF A POLYMER COMPOSED OF DIENE MONOMER UNITS AND NITRILE GROUP CONTAINING MONOMER UNITS AND HYDROGENATED POLYMER

This application is a continuation of International Application PCT/NL99/00508, which designated the United States and was filed on Aug. 9, 1999.

The invention relates to a process for the hydrogenation of a polymer composed of diene monomer units and nitrile group containing monomer units, as well as to hydrogenated polymer obtained.

Of polymers that contain conjugated diene monomer units and a nitrile group containing monomer unit, such as for instance nitrile butadiene rubber (NBR), the double bonds present in the chain can be hydrogenated, so that for instance the polymers become less sensitive to oxidative degradation, in particular oxidative degradation at elevated temperature. Such hydrogenated polymers are applied, for instance, under the bonnet in cars.

Commercial processes for the preparation of such hydrogenated polymers are very cumbersome and expensive. The polymer containing diene monomer units and nitrile group containing monomer units is for instance dissolved in a suitable solvent and then hydrogenated with hydrogen gas at a high pressure and a high temperature in the presence of a noble metal catalyst. The catalyst and the solvent must subsequently be removed. In addition, when high degrees of hydrogenation are achieved side reactions take place that result in undesirable branching and even gelation.

U.S. Pat. No. 4,452,950 discloses the hydrogenation of polymers containing conjugated diene monomer units and a nitrile group containing monomer unit, in the form of an aqueous dispersion, with the aid of hydrazine. The polymers in themselves are usually already present as an aqueous dispersion in the form of a latex after the polymerization, or can be given the form of an aqueous dispersion. This in itself yields a simplified process for the hydrogenation, but the process also has the drawback that crosslinking takes place in the hydrogenated polymer already during the hydrogenation reaction, but especially also after the hydrogenation reaction, when the hydrogenated polymer is coagulated, separated and dried and also afterwards, during storage. This causes for instance the rheological properties of the hydrogenated polymer to change in an uncontrolled manner, which has an adverse effect on further compounding and processing into moulded articles. It is even possible for the hydrogenated polymer to be entirely unsuitable for further use, because the crosslinking reaction has proceeded to such an extent that the hydrogenated polymer contains gel particles or is even entirely crosslinked.

It is the aim of the invention to provide a process that does not have the above-mentioned drawbacks or has them only to a strongly reduced extent.

Surprisingly, this aim is achieved in that crosslinks formed due to the hydrogenation are broken by adding, before, during or after the hydrogenation, a compound that satisfies formula I or formula II

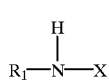

formula I

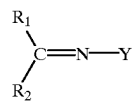

formula II where
R$_1$ is a hydrogen atom, an alkyl or cycloalkyl group with 1–30 carbon atoms, or an aromatic group with 6–30 carbon atoms, and
R$_2$ is an alkyl or cycloalkyl group with 1–30 carbon atoms, or an aromatic group with 6–30 carbon atoms, X is chosen from the group comprising —R$_3$, —OR$_4$, —SR$_4$, —NR$_5$R$_6$, where R$_3$, R$_4$ and R$_5$ are a hydrogen atom, an alkyl or cycloalkyl group with 1–30 carbon atoms or an aromatic group with 6–30 carbon atoms and R$_6$ is an alkyl or cycloalkyl group with 1–30 carbon atoms or an aromatic group with 6–30 carbon atoms
Y is chosen from the group comprising —R$_7$, —OR$_8$, —SR$_8$, —NR$_9$R$_{10}$ and —N=CR$_{11}$R$_{12}$ where R$_7$, R$_8$, R$_9$, R$_{10}$, R$_{11}$ and R$_{12}$ are a hydrogen atom, an alkyl or cycloalkyl group with 1–30 carbon atoms or an aromatic group with 6–30 carbon atoms, and it being possible for R$_3$-R$_{12}$ to also contain one or more heteroatoms from the groups 13, 14, 15, 16 or 17 of the Periodic System of the Elements.

The Periodic System of the Elements is understood to be Periodic System according to the IUPAC nomenclature, shown on the inside of the cover of the Handbook of Chemistry and Physics, 67th edition, 1986–1987.

The addition of such a compound causes strong or complete suppression of the crosslinking reaction. Moreover, addition of the compounds according to the invention has the advantage that no ozonolysis needs to be carried out in order to break crosslinked polymer chains.

It is true that U.S. Pat. No. 5,442,009 discloses ozone treatment of the hydrogenated and crosslinked polymer, so that chains of the hydrogenated polymer are broken and the effect of the crosslinking reaction is wholly or partly eliminated. After this treatment, however, a second crosslinking reaction occurs. According to U.S. Pat. No. 5,039,737 this second crosslinking reaction can be suppressed by treating the hydrogenated and ozone-treated hydrogenated polymer with hydroxylamine, but this is in itself already cumbersome and the combined treatments to which the hydrogenated polymer is to be subjected thus again become complex and expensive, so that no good alternative is obtained to the existing commercial processes for the hydrogenation of polymers containing conjugated diene monomer units and a nitrile group containing monomer unit. Furthermore, the ozone treatment is cumbersome. The second crosslinking reaction is a different type of reaction from the first crosslinking reaction. There is no indication for the use of hydroxylamine also for suppression of the first crosslinking reaction, the more so since hydroxylamine is used only to react with unstable terminal aldehyde groups to form stable oxime compounds. Moreover, the addition of hydroxylamine in a process for the hydrogenation of said polymers by the action of a copper catalyst as in U.S. Pat. No. 5,039,737, but without an ozonolysis being carried out, does not result in the crosslinks formed being broken and a gel-free, hydrogenated polymer being obtained.

Preferably, compounds are used in which R$_1$ is a hydrogen atom.

Examples of compounds that satisfy formula I are primary and secondary amines, hydrbxylamine, derivatives of hydroxylamine and substituted hydrazines, dithiocarbamyl-sulphenamide compounds, thiuram compounds and dithiocarbamate compounds. Specific examples are methylamine, ethylene diamine, dodecylamine, ethanolamine, cyclohexyldiamine, o-phenylene diamine, 3,4-toluene diamine, 1,8-naphthalene diamine, aniline, methylhydrazine, phenylhydrazine, o-aminophenol, o-aminobenzoic acid, hydroxylamine, N-isopropyl hydroxylamine, O-methylhydroxylamine, O-t-butylhydroxylamine and the sulphur compounds tetramethylthiuram disulphide, N-oxydiethylene dithiocarbamyl-N'-oxydiethylene-sulphenamide. Preferably, use is made of compounds that satisfy formula I where $R_3$ is an aromatic group with 6–15 carbon atoms, $R_4$ is a hydrogen atom, or an alkyl group with 1–5 carbon atoms, $R_5$ is a hydrogen atom, an alkyl group with 1–6 carbon atoms or an aromatic group with 6–10 carbon atoms and $R_6$ is an alkyl group with 1–6 carbon atoms or an aromatic group with 6–10 carbon atoms, it being possible for $R_3$–$R_6$ to also contain one or more heteroatoms from the groups 13, 14, 15, 16 or 17 of the Periodic System of the Elements. Most preferably, hydroxylamine or orthoaromatic diamines are used.

Examples of compounds that satisfy formula II are imines, azines, hydrazones, semicarbazones, oximes and benzothiazoles. Specific examples are N-phenylbutyl imine, N-isopropylbenzaldehyde imine, acetone azine, benzaldehyde azine, cyclohexanone azine, benzaldehyde hydrazone, benzophenone hydrazone, benzaldehyde oxime, p-nitrobenzaldehyde oxime, o-, p-, and m-chlorobenzaldehydeoxime, cyclohexanone oxime, acetonoxime, 2-mercaptobenzothiazole, N-cyclohexyl-2-benzothiazole sulphenamide methyl ethyl ketone oxime, benzophenone oxime.

Preferably, compounds are used that satisfy formula II, where $R_7$ is an aromatic group that contains 6–10 carbon atoms, $R_8$ is a hydrogen atom or an alkyl group with 1–6 carbon atoms, $R_9$–$R_{11}$ are a hydrogen atom, an alkyl group with 1–6 carbon atoms, or an aromatic group with 6–10 carbon atoms, and $R_{12}$ an alkyl group with 1–6 carbon atoms or an aromatic group with 6–10 carbon atoms, it being possible for $R_7$–$R_{12}$ to also contain one or more heteroatoms from the groups 13, 14, 15, 16 or 17 of the Periodic System of the Elements. More preferably, use is made of compounds that satisfy formula II where Y is an —OH— group. Most preferably, use is made of a compound that satisfies formula II where Y is an OH group, $R_1$ a hydrogen atom and $R_2$ an alkyl or cycloalkyl group with 1–15 carbon atoms or an aryl group with 6–10 carbon atoms. Examples of these compounds are benzaldehyde oxime, propionaldehyde oxime and dodecylaldehyde oxime.

Compounds that satisfy the description of formula I are preferably added after the hydrogenation reaction, more preferably before or during separation of the hydrogenated polymer, most preferably to the hydrogenated polymer during a post-treatment. Surprisingly, this suppresses the crosslinking reaction in the hydrogenated polymer even further. In particular, stronger suppression of the crosslinking during storage takes place. This is important for instance if a hydrogenated polymer with a high molecular weight is used. The occurrence of a crosslinking reaction has a strong effect on the rheological properties of such a polymer.

Hydroxylamine is preferably added to the hydrogenated polymer in the form of an aqueous solution. Most preferably, the hydrogenated polymer is contacted with a 1–20 wt. % solution of hydroxylamine in water.

More preferably, a combination of an oxime, of the general formula II, where Y is an OH group, $R_1$ a hydrogen atom and $R_2$ an alkyl or cycloalkyl group with 1–15 carbon atoms or an aryl group with 6–10 carbon atoms, and hydroxylamine is added. The oxime is then preferably added before or during the hydrogenation of the polymer, while the hydroxylamine is preferably added during post-treatment of the hydrogenated polymer crumb.

Even more preferably, a compound according to formula I or II is present during kneading of hydrogenated polymer at elevated temperature. The kneading temperature preferably lies between 50 and 300° C., most preferably between 100 en 200° C.

Most preferably, the hydrogenated polymer is kneaded in the presence of a compound according to formula I, with also a carbonyl-group containing compound (for instance an aldehyde or ketone) being present. Most preferably, a ketone is used. Examples of suitable ketones are acetophenone, benzophenone and 2-dodecylketone. This further accelerates the degradation of crosslinks by the action of the compounds according to the invention, so that the kneading time and/or the kneading temperature can be reduced. Special preference is given to o-aromatic diamines as the compounds according to formula I in combination with a ketone. Preferably, o-phenylene diamine or 3,4-toluene diamine are used.

The polymer that is used in the process according to the invention can be obtained by the polymerization of diene monomers, nitrile group containing monomer units and optionally other monomers, such as for instance acrylates or methacrylates. As the conjugated diene monomers use can for instance be made of 1,3-butadiene, 2,3-dimethylbutadiene, isoprene and 1,3-pentadiene. As the nitrile group containing monomer units use can for instance be made of acrylonitrile and methacrylonitrile. Preferably, 1,3-butadiene and acrylonitrile are used.

The polymer preferably contains 5–95 wt. % of one or more conjugated diene monomers and 95–5 wt. % of a nitrile group containing monomer unit. More preferably, the polymer contains 40–90 wt. % of butadiene monomer and 60–10 wt. % of acrylonitrile.

The polymer can be prepared using various processes which in themselves are known from the state of the art: examples of suitable processes are emulsion polymerization, solution polymerization or bulk polymerization.

Preferably, the polymer has been prepared by means of an emulsion polymerization in water, so that the polymer becomes available as an aqueous dispersion, even more preferably as a latex. U.S. Pat. No. 5,442,009 gives clear instructions for the preparation of a polymer, the conditions to be used, the initiators to be used, etc. If the polymer does not become available in the form of a latex, then the polymer is preferably introduced into an aqueous dispersion.

The polymer is preferably subjected to the hydrogenation in the form of the aqueous dispersion, use being made preferably of a diimide, or a compound forming a diimide and optionally a catalyst.

Preferably, hydrazine is used as the compound forming a diimide, with the diimide being formed in the presence of an oxidizing agent. Examples of suitable oxidizing agents are air, oxygen, ozone, peroxides, hydroperoxides, iodine, iodates, hypochlorite and similar compounds. Particularly suitable oxidizing agents are chosen from the group comprising peroxides and hydroperoxides. Most preferably, use is made of hydrogen peroxide.

The ratio of the molar amount of hydrazine relative to peroxide or hydroperoxide is preferably between 0.9 and 1.2.

The oxidizing compound is for instance present in a molar ratio of 0.1:1 to 100:1 relative to the carbon—carbon double bonds. Preferably, this ratio is between 0.8:1 and 5:1, most preferably between 0.9:1 and 1.5:1.

Preferably, a catalyst is used which contains an element from group 13 of the Periodic System of the Elements. Very good results are obtained if boron is chosen as the element from group 13. Even more preferably, the catalyst is chosen from the group comprising borates, peroxyborates and boric acid ($H_3BO_3$). Most preferably, boric acid is used.

The amount of hydrogenation is the percentage of carbon—carbon double bonds that is saturated after the hydrogenation reaction compared with the initial amount of double bonds. The process of the present invention provides polymers that for instance have an amount of hydrogenation higher than 60%. Preferably, the amount of hydrogenation is higher than 80%. The process is eminently suitable for the preparation of polymers with an amount of hydrogenation higher than 90%, because the present process provides hydrogenated polymers that can advantageously be prepared and have a low gel content.

The hydrogenation reaction temperature is between 0° and 250° C. Preferably, the temperature is between 200 and 150° C. Special preference is given to a reaction temperature of 300 to 80° C.

During the hydrogenation in a latex a small amount of solvent may be present for the unsaturated polymer. In that case the amount of solvent may for instance vary between 0 and 20 wt. % (solvent relative to polymer).

After the hydrogenation reaction the hydrogenated polymer can be separated from the solvent or from the latex. Examples of suitable separation processes are precipitation and steam stripping. Particularly precipitation is a suitable purification method, for which standard processes can be used, for instance the addition of an acid or salt to the aqueous dispersion of the polymer, or administration of an alcohol. Preferably, use is made of an alcohol or a magnesium sulphate solution in water for coagulation of the hydrogenated polymer latex.

After separation of the hydrogenated polymer a mixture is obtained of polymer crumb and water, which may contain all kinds of compounds, such as hydrazine, peroxide and soap residues, etc. Before or during the separation compounds according to the present invention can be added, as well as all kinds of additives, for instance stabilizers, dyestuffs, plasticizers, etc.

Preferably, before or after hydrogenation of the polymer stabilizers are added that are chosen from the group comprising free radical stabilizers, for instance phenolic antioxidants (such as for instance 2,6-di-tert.butyl-p-cresol or 2,2'-methylene bis(4-methyl-6-tert.butyl phenol)), amine antioxidants (such as for instance p-phenylene diamine derivatives, N-isopropyl-N"-phenyl-p-phenylene diamine), dihydroquinoline derivatives (such as for instance 2,2,4-trimethyl-1,2-dihydroquinoline), benzimidazole derivatives (such as for instance 2-mercaptobenzimidazole) and naphthylamine derivatives (such as for instance phenyl-alpha-naphthylamine). Addition of such stabilizers yields the advantage that the stability of the hydrogenated polymer is improved even further, so undesirable gel formation will no longer occur during storage and further processing of the hydrogenated polymer, either.

After the separation the polymer can be worked up, for instance by filtering the hydrogenated polymer, drying in it in an oven, in a fluid-bed drier, etc., with drying optionally taking place at reduced pressure.

If post-treatment of the hydrogenated polymer crumb is applied, a short and/or incomplete working up procedure may be used. The hydrogenated polymer can for instance be subjected to a short working up procedure when the post-treatment involves stirring of the polymer crumb in an aqueous solution of a compound according to the present invention. In such a case a simple filtration step suffices, so that a wet crumb is obtained that is suitable for further use.

If a kneading step is applied as post-treatment, it may, however, be desirable to use the hydrogenated polymer in virtually moisture-free condition, so that working up of the hydrogenated polymer preferably includes a drying step. Kneading can for instance take place in a Brabender or an extruder. This preferably involves the addition of a compound that satisfies formula I or II in an amount of 0.1–10 wt. % on the basis of the polymer, most preferably 0.5–2%.

The invention also relates to a polymer composition in solid form that contains hydrogenated polymer composed of diene monomer units and nitrile group containing monomer units, the hydrogenated polymer having an $\alpha/\beta$ peak ratio >1, measured by means of $^1$H-NMR, the $\alpha$ peak having been measured between 2.05 and 2.2 ppm and the $\beta$ peak between 1.8 and 2.05 ppm, a gel content of less than 15 wt. % and a molecular weight distribution (Mw/Mn, measured using gel permeation chromatography (GPC)), of the soluble part of the polymer composition of <10.

Hydrogenated polymers with an $\alpha/\beta$ peak ratio >1 have an improved thermal and oxidative stability.

It is true that a process involving the hydrogenation of NBR in solution, followed by solvent removal, as for instance disclosed in EP 174 551 A, also yields a polymer composition that contains an H-NBR with a low gel content. However, this involves a cumbersome hydrogenation process, the polymer composition may contain solvent residues and the process results in a different type of H-NBR, with for instance an NMR spectrum that deviates from the H-NBR of the polymer composition according to the invention. An H-NBR prepared according to EP 174-551 A for instance has an $\alpha/\beta$ peak ratio <1.

Preferably, the polymer composition according to the invention contains an H-NBR with a gel content of at most 10 wt. %, even more preferably at most 5 wt. %.

Preferably, the soluble part of the polymer composition has a weight average molecular weight (Mw), measured by GPC, higher than 100,000.

A further advantage of the polymer composition according to the invention is that the gel content still or at least still has a low gel content even after a very long storage time.

The polymer composition according to the invention may contain additives, such as for instance stabilizers, chosen from the group comprising free radical stabilizers, phenolic antioxidants, amine antioxidants, dihydroquinoline derivatives, benzimidazole derivatives and naphthylamine derivatives. The polymer composition may for instance also contain reinforcing fibres or a second polymer besides H-NBR.

The polymer composition according to the invention may for instance be injection moulded to form moulded articles. Examples of moulded articles, in which the polymer composition according to the invention shows up very well are automotive parts to be mounted in the engine compartment.

Below, the invention will be elucidated with reference to some examples, without however being limited to these examples.

The amount of hydrogenation of hydrogenated polymers was determined by means of 1H-NMR on a Brucker AC-200 Mhz. The determination of the amount of hydrogenation took place as described in Rubber Chemistry and Technology, 1990, Vol 63, p. 245.

Soxhlet extractions were performed with chloroform as the extraction agent and in a Whatman cellulose extraction thimble with an internal diameter of 19 mm and a length of 90 mm. The thimble was filled with about 0.5 grams of polymer, after which the extraction was carried out for 6 hours. The gel content was determined on the basis of the weight increase of the thimble after evaporation of the chloroform and stabilization of the thimble weight.

Experiment A 38.8 grams of hydrazine monohydrate, to which a mixture of 5 grams of boric acid, 40 grams of water and a few drops of silicon oil had been added, were added to 200 grams of latex Nysin™ 33-3, with a solids content of 25%, a butadiene content of 67 wt. %, an acrylonitrile content of 33 wt. %, and a Mooney$_{125° C.}^{1+4}$ of 30. After the temperature had been adjusted to 40° C., in 6 hours 89 grams of a 30% m/m (=on a mass basis) solution of hydrogen peroxide in water were added. The polymer was [ . . . ] in 800 grams of a 0.5% m/m solution of $MgSO_4 \cdot 7H_2O$. Immediately upon precipitation and upon vacuum drying at room temperature in about 16 hours the polymer was found to be insoluble in chloroform.

EXAMPLE I

Experiment A was repeated, the difference being that for precipitation 5% on a mass basis of the polymer present of the compounds listed in Table 1 was added to 10 grams of the latex. After 12 hours the polymer was precipitated in 50 grams of a 0.5% m/m solution of $MgSO4 \cdot 7H2O$. The amount of hydrogenation was found to be 91% (1H-NMR in CDCl3 of sample 1.2). Immediately upon precipitation the visual solubility was measured and crosslinking was determined visually on the basis of the visual solubility in chloroform.

TABLE 1

Compounds and their effect on the visual solubility.

|   | Compound | Result |
|---|---|---|
| A | none | insoluble |
| I.1 | phenylhydrazine | visually soluble |
| I.2 | hydroxylamine | visually soluble |
| I.3 | O-methylhydroxylamine | visually soluble |
| I.4 | O-ethylhydroxylamine | visually soluble |
| I.5 | hydroxylamine sulphuric acid salt | visually soluble |
| I.6 | hydroxylamine hydrochloride | visually soluble |
| I.7 | cyclohexanone oxime | visually soluble |
| I.8 | benzaldehyde oxime | visually soluble |

The addition of compounds according to the invention gives a visually soluble polymer after precipitation.

EXAMPLE II

The visual solubility of the polymer obtained in example I.2 was visually monitored over time by daily dissolving a sample in chloroform. After the polymer had been kept at room temperature under vacuum for 18 days it was still found to be completely visually soluble. After 22 days, however, gel particles were observed.

EXAMPLE III

Experiment A was repeated, the difference being that after precipitation the polymer (approx. 25 grams) was not immediately dried but was stirred for 6 days in approx. 100 ml of a 10% solution of hydroxylamine in water at room temperature. Afterwards, it was dried for 16 hours under vacuum at room temperature. The polymer was completely visually soluble in d-chloroform, in contrast to a sample to which no hydroxylamine had been added. The amount of hydrogenation was found to be 89%. The visual solubility of the polymer was visually monitored over time by dissolving a sample in chloroform once every week. After having been kept for about 60 days at room temperature under vacuum, the polymer was found to be still completely visually soluble. However, after about 75 days the polymer was found to contain gel particles.

Example III demonstrates that stirring of the hydrogenated polymer in a solution of hydroxylamine yields a visually soluble polymer which already remains stable for a very long time.

EXAMPLE IV 715 grams of hydrazine monohydrate, with added to it a mixture of 100 grams of boric acid, 500 grams of water and a few drops of defoamer (GEO FM VC), were added to 4 liters of latex Nysin™ 33-3, with a solids content of 25%, a butadiene content of 67% and a Mooney of 30. After the temperature had been adjusted to 40° C., in 12 hours 1770 grams of a 30% m/m (=on a mass basis) solution of hydrogen peroxide in water were added. Then cooling to room temperature took place and three samples of 100 grams of latex were taken to which 0.3 gram <(I)>, 0.75 <(II)> and 1.5 grams <III)> of benzaldehyde oxime, respectively, were added, and after 24 hours at 70° C. the polymer was separated off in 400 grams of a 0.5% m/m solution of $MgSO_4 \cdot 7H_2O$ and dried overnight at room temperature under vacuum. The amount of hydrogenation was found to be 89% ($^1$H-NMR in $CDCl_3$). A sample taken without the addition of benzalhyde oxime was found to be insoluble after drying. Crosslinking of the polymer was visually monitored on the basis of the visual solubility in chloroform. After having been kept at room temperature for 113 days, the polymer was found to be still visually soluble. Soxhlet extraction after 20 days' storage yielded 2% gel for sample I, and 0% for both II and III. After 113 days a gel content of 6% was measured for II and III. Heating of the polymer at 70° C. resulted in the formation of gel particles in about 0.5 hour.

EXAMPLE V

Experiment A was repeated, the difference being that 2.5 grams of benzaldehyde oxime were added already before the hydrogenation. The amount of hydrogenation was 89%. 10 grams of latex were separated off in 50 grams of a 0.5% m/m solution of $MgSO_4 \cdot 7H_2O$ and dried overnight at room temperature under vacuum. This polymer was found to be completely soluble, in contrast to the polymer in experiment A.

EXAMPLE VI 5 grams of benzaldehyde, 45.9 grams of hydrazine monohydrate, with added to it a mixture of 5 grams of boric acid, 40 grams of water and a few drops of silicon oil, were added to 200 grams of latex Nysin™ 33-3, with a solids content of 25%, a butadiene content of 67% and a Mooney of 30. After the temperature had been adjusted to 40° C., 103 grams of a 30% m/m (=on a mass basis) solution of hydrogen peroxide in water were added in 8 hours. subsequently, the polymer was precipitated and suspended for 6 days in an aqueous hyam solution, as in Example 3. Upon drying the polymer was found to be completely soluble in d-chloroform and a amount of hydrogenation of 94% was measured. After 120 days the polymer was still completely soluble and no gel particles were visible.

EXAMPLE VII 744 grams of hydrazine monohydrate, with added to it a mixture of 100 grams of boric acid, 500 grams of water and a few drops silicon oil, were added to 4 liters of latex Nysin™ 33-3, with a solids content of 25%, a butadiene content of 67% and a Mooney of 30. After the temperature had been adjusted to 40° C., 1770 grams of a 30% m/m (=on a mass basis) solution of hydrogen peroxide in water were added in 12 hours. The polymer was found to be crosslinked upon precipitation with 0.5% MgSO4.7H2O solution. The gel content was found to be >60% after Soxhlet extraction. The crosslinked sample was placed in a 10% hydroxylamine solution for 4 days, dried and dissolved in CDCl3. The amount of hydrogenation was found to be 90%.

About 40 grams of precipitated polymer were directly introduced into a Brabender at 125° C. and dried for 30 minutes at this temperature. The polymer was found to be insoluble in chloroform.

When this experiment was repeated, but this time with addition of about 2 grams of o-phenylene diamine after 4 minutes, a polymer was obtained that was found to be soluble. After 3 days the polymer was yet again found to contain gel particles.

When this experiment was repeated at 200° C. a polymer was obtained that was found to be soluble after more than 60 days. After this period the polymer was heated to 70° C. After exposure to the air at this temperature for 10 days, the gel content was found to be 7%.

EXAMPLE VIII

2% (m/m relative to the polymer) of flexzone 11L(N-1,4-dimethylphenylphenyl-N'-phenyl-p-phenylene diamine (7-PPD), 744 grams of hydrazine monohydrate, with added to it a mixture of 100 grams of boric acid, 500 grams of water and a few drops of GEO FM VC, were added to 4 liters of latex Nysin™ 33-3, with a solids content of 25%, a butadiene content of 67% and a Mooney of 30. After the temperature had been adjusted to 40° C., 1770 grams of a 30% m/m (=on a mass basis) solution of hydrogen peroxide in water was added in 12 hours. Upon hydrogenation the hydrazine content was found to be about 30 ppm. Precipitation of 10 grams of latex in 50 grams of 0.5% MgSO4.7H2O resulted in a crosslinked polymer. After Soxhlet extraction the gel content was found to be >80%. The crosslinked sample was placed in a 10% hydroxylamine solution for 4 days and then dissolved in CDCl3. The amount of hydrogenation was found to be 96%.

The polymer was precipitated at room temperature in a blender by diluting it twice with demineralized water and then, with vigorous stirring, injecting about 1% (m/m) relative to the total mass of a 36% (m/m) solution of MgSO4.7H2O in demineralized water. The precipitated polymer was subsequently air-dried in about 16 hours at 70° C.

At 200° C. 20 grams of crosslinked H-NBR were introduced into a Brabender and 2 grams of o-phenylene diamine were added. After about 30 minutes the polymer was removed. It was found to be completely soluble in chloroform. When this experiment was repeated with toluene-3,4 diamine and 1,8-naphthalene diamine, gel-free polymers were again obtained. The sample that had been prepared with o-phenylene diamine was then heated to 70° C and after having been exposed to the air at this temperature for 20 days the polymer was found to be still completely soluble in chloroform.

EXAMPLE IX

2% (m/m relative to the polymer) of flexzone 11L(N-1,4-dimethylphenylphenyl-N'-phenyl-p-phenylene diamine (7-PPD), 651 grams of hydrazine monohydrate, with added to it a mixture of 100 grams of boric acid, 500 grams of water and a few drops of silicon oil, were added to 4 liters of latex Nysin™ 33-3, with a solids content of 25%, a butadiene content of 67% and a Mooney of 30. After the temperature had been adjusted to 40° C., 1687 grams of a 30% m/m (=on a mass basis) solution of hydrogen peroxide in water were added in 12 hours. At the end of the hydrogenation the latex contained less than 100 ppm of hydrazine.

The polymer was precipitated at room temperature in a blender by twice diluting it with demineralized water and then, with vigorous stirring, injecting about 1% (m/m) relative to the total mass of a 36% (m/m) solution of MgSO4.7H2O in demineralized water. The precipitated polymer was then air-dried in about 16 hours at 70° C. After Soxhlet extraction the gel content was found to be >80%. The crosslinked sample was placed in a 10% hydroxylamine solution for 4 days and was dissolved in CDCl3. The amount of hydrogenation was found to be 94%.

At 200° C. 20 grams of crosslinked and dried H-NBR were introduced into a Brabender and 0.4 gram of o-phenylene diamine and 0.6 gram of acetophenone were added. After about 30 minutes the polymer was removed. It was found to be completely soluble in chloroform. After two days' heating by exposure to the air at 70° C. the polymer was found to be soluble in chloroform.

When this experiment was repeated without acetophenone a polymer was obtained which after one day was found to contain gel particles.

When this experiment was repeated with benzophenone and 2-dodecylketone comparable results were obtained.

EXAMPLE X

On a DSM mini-extruder 4 grams of the dried polymer of the preceding experiment were circulated for 30 minutes at 200° C. and then taken out of the extruder. The polymer was found to be insoluble.

When this experiment was repeated with 0.2 gram of o-phenylene diamine, a soluble polymer was obtained in about 10 minutes.

What is claimed is:

1. Process for the hydrogenation of a polymer composed of diene monomer units and nitrile group containing monomer units, in which the hydrogenation in the form of an aqueous dispersion is carried out in the presence of hydrazine and an oxidizing compound, comprising breaking crosslinks formed as a result of the hydrogenation by adding after the hydrogenation a compound that satisfies formula I or by adding before, during or after the hydrogenation a compound that satisfies formula II

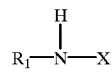

formula I

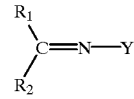

formula II where
$R_1$ is a hydrogen atom, an alkyl or cycloalkyl group with 1–30 carbon atoms, or an aromatic group with 6–30 carbon atoms and
$R_2$ is an alkyl or cycloalkyl group with 1–30 carbon atoms, or an aromatic group with 6–30 carbon atoms, X is selected from the group consisting of —$R_3$, —$OR_4$, —$SR_4$, and —$NR_5R_6$, where $R_3$, $R_4$, and $R_5$ are a hydrogen atom, an alkyl or cycloalkyl group with 1–30 carbon atoms, or an aromatic group with 6–30 carbon atoms and $R_6$ is an alkyl or cycloalkyl group with 1–30 carbon atoms, or an aromatic group with 6–30 carbon atoms, Y is selected from the group consisting of —$R_7$, —$OR_8$, —$SR_8$, —$NR_9R_{10}$, and —$N=CR_{11}R_{12}$, where $R_7$, $R_8$, $R_9$, $R_{10}$, $R_{11}$, and $R_{12}$ are a hydrogen atom, an alkyl or cycloalkyl group with 1–30 carbon atoms, or an aromatic group with 6–30 carbon atoms, and wherein $R_3$–$R_{12}$ optionally contain one or more heteroatoms from the groups 13, 14, 15, 16, or 17 from the Periodic System of the Elements, and whereby the process is absent carrying out ozonolysis to break said crosslinks.

2. Process according to claim 1, characterized in that $R_1$ is a hydrogen atom.

3. Process according to claim 2, characterized in that hydroxylamine is used as the compound that satisfies formula I.

4. Process according to claim 3, characterized in that crumb of the hydrogenated polymer is contacted with a 1–10 wt. % solution of hydroxylamine in water.

5. Process according to claim 1, characterized in that use is made of a compound that satisfies formula II with Y being an OH group.

6. Process according to claim 1, characterized in that the compound satisfies formula II with Y being an OH group, R1 a hydrogen atom and R2 an alkyl or cycloalkyl group with 1–15 carbon atoms or an aryl group with 6–10 carbon atoms.

7. Process according to claim 1, characterized in that the compound that satisfies formula II, where Y is an OH group, $R_1$ a hydrogen atom and $R_2$ an alkyl or cycloalkyl group with 1–15 carbon atoms or an aryl group with 6–10 carbon atoms, is added before or during the hydrogenation and wherein hydroxylamine is added during a post-treatment of the hydrogenated polymer.

8. Process according to claim 7, characterized in that the hydrogenated polymer is kneaded at elevated temperature.

9. Process according to claim 8, characterized in that the temperature at which the hydrogenated polymer is kneaded lies between 100 and 200° C.

10. Process according to claim 8, characterized in that an O-aromatic diamine is used as the compound that satisfies formula (I).

11. Process according to claim 1, comprising adding o-phenylene diamine after the hydrogenation as said compound that satisfies formula I.

12. Process according to claim 1, comprising adding 3,4-toluene diamine after the hydrogenation as said compound that satisfies formula I.

13. Process according to claim 1, comprising adding 1,8 naphthalene diamine after the hydrogenation as said compound that satisfies formula I.

14. Process according to claim 8, comprising adding o-phenylene diamine after the hydrogenation as said compound that satisfies formula I.

15. Process according to claim 8, comprising adding 3,4-toluene diamine after the hydrogenation as said compound that satisfies formula I.

16. Process according to claim 8, comprising adding 1,8 naphthalene diamine after the hydrogenation as said compound that satisfies formula I.

17. Process according to claim 9, comprising adding o-phenylene diamine after the hydrogenation as said compound that satisfies formula I.

18. Process according to claim 9, comprising adding 3,4-toluene diamine after the hydrogenation as said compound that satisfies formula I.

19. Process according to claim 9, comprising adding 1,8 naphthalene diamine after the hydrogenation as said compound that satisfies formula I.

* * * * *